United States Patent [19]

Enterline et al.

[11] Patent Number: 5,200,008
[45] Date of Patent: Apr. 6, 1993

[54] RADIAL TIRE TREAD AND METHOD OF MOUNTING A TIRE WITH SAID TREAD

[75] Inventors: Gary D. Enterline, Greer; Michel A. de Reynal, Greenville, both of S.C.

[73] Assignee: Michelin Recherche et Technique, Frib, Switzerland

[21] Appl. No.: 652,412

[22] Filed: Feb. 7, 1991

[51] Int. Cl.⁵ ............................................. B60C 11/11
[52] U.S. Cl. ............................... 156/110.1; 152/209 R
[58] Field of Search .......... 152/209 R, 209 A, 209 D; 156/110.1

[56] References Cited

U.S. PATENT DOCUMENTS 4,298,046 11/1981 Herbelleau ...................... 152/209 R

FOREIGN PATENT DOCUMENTS

| 0194069 | 9/1986 | European Pat. Off. | 152/209 R |
| 0060307 | 3/1986 | Japan | 152/209 R |
| 0097405 | 4/1988 | Japan | 152/209 R |
| 0301108 | 12/1988 | Japan | 152/209 A |
| 0022602 | 1/1989 | Japan | 152/209 R |
| 2-283505 | 11/1990 | Japan | 152/209 R |
| 2-93205 | 12/1990 | Japan | |
| 2-93206 | 12/1990 | Japan | |

Primary Examiner—Michael W. Ball
Assistant Examiner—Nancy T. Krawczyk
Attorney, Agent, or Firm—Robert R. Reed

[57] ABSTRACT

The tread design of a radial pneumatic tire for ground vehicles is characterized by lateral or transverse grooves on the shoulder ribs having an incline from the normal to the contact surface in one direction and the lateral or transverse grooves in the center of the tread width being inclined in the reverse direction. Improved wear rates with uniform wear is obtained on a drive axle with proper tire rotation. A reversed direction of rotation on the non-drive axle results in more even wear with potentially less vibration and noise.

Lateral grooves are inclined form approximately 20 to 30 degrees and leading edges of some tread blocks have acute angles while other tread blocks have trailing edges with acute angles. The resultant distribution of longitudinal tangential stress on tread blocks is improved.

8 Claims, 4 Drawing Sheets

RADIAL TIRE TREAD AND METHOD OF MOUNTING A TIRE WITH SAID TREAD

TECHNICAL FIELD

The present invention relates to the improvements in treads of tires used for ground vehicles, including but not limited to passenger cars and light trucks. In particular it concerns the shape of the tread blocks and their lateral grooves within each zone across the tire width for improved wear, plus other potential performance improvements.

BACKGROUND OF THE INVENTION

Numerous patents use inclined lateral grooves to improve traction. The patent U.S. Pat. No. 4,298,046 by Herbelleau et al includes slits that are inclined with respect to a normal to the tread and closely spaced between lateral grooves to give improved adherence upon braking or acceleration. Slits inclined in a direction of rotation (forward) were located in the two lateral zones of the tire width while those in the center zone were inclined in an opposite direction. Under load the tire starts to become worn to cause directed wear of the tire contact surface, typical of heel-toe wear. The forward inclined slits were designed to be active in longitudinal acceleration (driving) and slits in the opposite direction were designed to be active in braking.

The French patent FR 1548673 by Devienne shows saw-tooth tread block elements having oblique faces or teeth on one of the bands (ribs) being crossed with regard to the oblique faces or teeth of the adjacent band (rib). The two bands are separated by a groove parallel to the equatorial plane. The purpose of the invention being to improve driving as well as braking adhesion by alternating oblique faces across the tread width. The same tire would be used on all axles of the vehicle.

The German patent DE 8707957 by Frisch has scales, or short tread blocks, arranged circumferentially in rows. Circumferential grooves between rows of tread block form circumferential ribs. A sharp leading edge on the tread block improves the driving traction of each tread block. Alternating ribs or rows having leading and trailing sharp edges respectively, provide both forward and reverse driving assistance. The same tire is used on all axles of the vehicle.

A variable incline on the faces of tread blocks is disclosed in the U.S. Pat. No. 4,186,788 patent by Pommier. The tractor tires of this patent have tread lugs where the leading edge of the lugs have an angle between the lug contact surface and its leading face in the center of the tread width smaller than the same angle at each shoulder segment. This unidirectional tire does not have ribs as such and these angles are obtuse. This patent discloses that abnormal (uneven) wear disappears giving way to uniform wear which lengthens the life of the tire. The primary purpose of this patent is to control adherence without regard to tangential stresses as wear progresses. The non-directional tire of this invention has well defined ribs and is also used as a non-drive axle tire.

The U.S. patent application Ser. No. 07/590303 by Remick is a unidirectional drive axle tire with tread blocks having smaller inclined lateral groove angles with respect to the radial direction at their leading face than at their trailing face. This vehicle tire, designed primarily for heavy trucks, has significant improvements in uneven wear and the life of the tire. The groove angles result in the leading edge, or corner, of each tread block being more abrupt, but angles greater than 90 degrees are maintained. A defined variation in these angles from the lateral edges to the center of the tire width is not specified. The attempt to control longitudinal tangential stress at the contact surface is not disclosed in this application, and using the tire on a non-drive axle while reversing its rotation is not discussed.

This background information does not teach one skilled in the art how to design the tire tread using reverse cut or sloping lateral grooves to reduce wear, nor is it obvious to extend the scope of any patent or combine patents to obtain the tread design of the invention. No prior art is known to the inventors that suggests reversing the rotation of the tire when used on non-drive axle compared with the drive axle to reduce overall wear of the vehicle's tires. Only patent U.S. Pat. No. 4,298,046 suggests groove angles having large angles between a normal to the contact surface and the center axis of the groove such that acute angles exist at the edge of the tire contact surface and the groove. However, the purpose of this patent was to produce wear that increased tire traction. The invention reduces uneven wear and extends the tire's life.

SUMMARY OF THE INVENTION

The problem forming the basis of the invention is to overcome the tendency for uneven tire wear in average running conditions. On the driving axle of a passenger car or light truck the tread usually has center wear, and on the non-drive axle the critical wear is heel-toe wear on shoulder (or lateral) tread blocks. The purpose of this invention is to modify the tangential stresses on the tread blocks to achieve even wear and longer tire life. While this purpose was completely achieved, the initial tread design and tire rotation gave only optimum wear on the drive axle of vehicles. On the non-drive axle, where the wear rate is smaller, irregular wear was not reduced. However, when the direction of rotation of the tire was reversed on the non-drive axle, a marked improvement was obtained and the average wear of all tires was improved significantly. Therefore, the invention features not only a modified tread pattern but also a prescribed way to rotate the tire on the drive versus non-drive axles during forward motion of the vehicle.

The invention utilizes sloping tread blocks to change the relative tangential stress on the tread blocks in the center segment of the tread width compared with those in the lateral segments. The theory can be illustrated with a simple physical experiment using a rhombic prism under load, which will be described and discussed as FIG. 3. The desire for the drive axle is to achieve a relatively uniform longitudinal tangential stress on all the circumferential ribs of the tread design. Classically the center segment of the tread width has a longitudinal tangential stress which is biased toward driving, or increasing the vehicle speed, relative to the lateral segments which are biased toward braking the vehicle. To make the center segment more braking, the lateral grooves are reverse inclined to provide reverse inclined tread blocks. Inversely, to make the lateral segments more driving the lateral grooves are inclined to provide inclined tread blocks. Furthermore, a result of both inclined and reverse inclined tread blocks is to increase the tire circumference in one segment of the tire and decrease the circumference in the other segment, due to differences in tread block mobility and the deflection of the steel belts. This increase or decrease also changes the relative magnitude of tangential stresses in the center segment of the tire compared with lateral segments.

The reversal of rotation used for the non-drive axle tire increases the driving bias of the center segment of the tire width as well as the braking bias of the lateral segments. Although tangential stresses are not uniform, the tire wear, being more regular and even, was improved significantly for this rotation when compared with the rotation used for a drive axle tire. The stress distribution between the normal stress, the longitudinal tangential stress and the lateral tangential stress on each tread block are such that uneven wear is reduced. The tangential stress due to Poisson stresses, rolling resistance and braking stresses and stresses due to contact with the supporting surface are all important in obtaining minimum wear with average running conditions.

The tread design of preferred embodiments are illustrated, discussed and described below. It concerns embodiments not limiting the scope of the invention. The configuration of each circumferential and lateral groove and the definition of tread blocks so generated by said grooves can be altered and still remain within the scope of the invention. Furthermore, the type of vehicle can be any similar vehicle or trucks, off-road vehicles and the like.

BRIEF DESCRIPTION OF THE DRAWINGS

Embodiments of the invention will now be described by way of illustration and not of limitation, with reference to the accompanying drawings, in which.

DETAILED DESCRIPTION AND PREFERRED EMBODIMENTS

Figure 1:
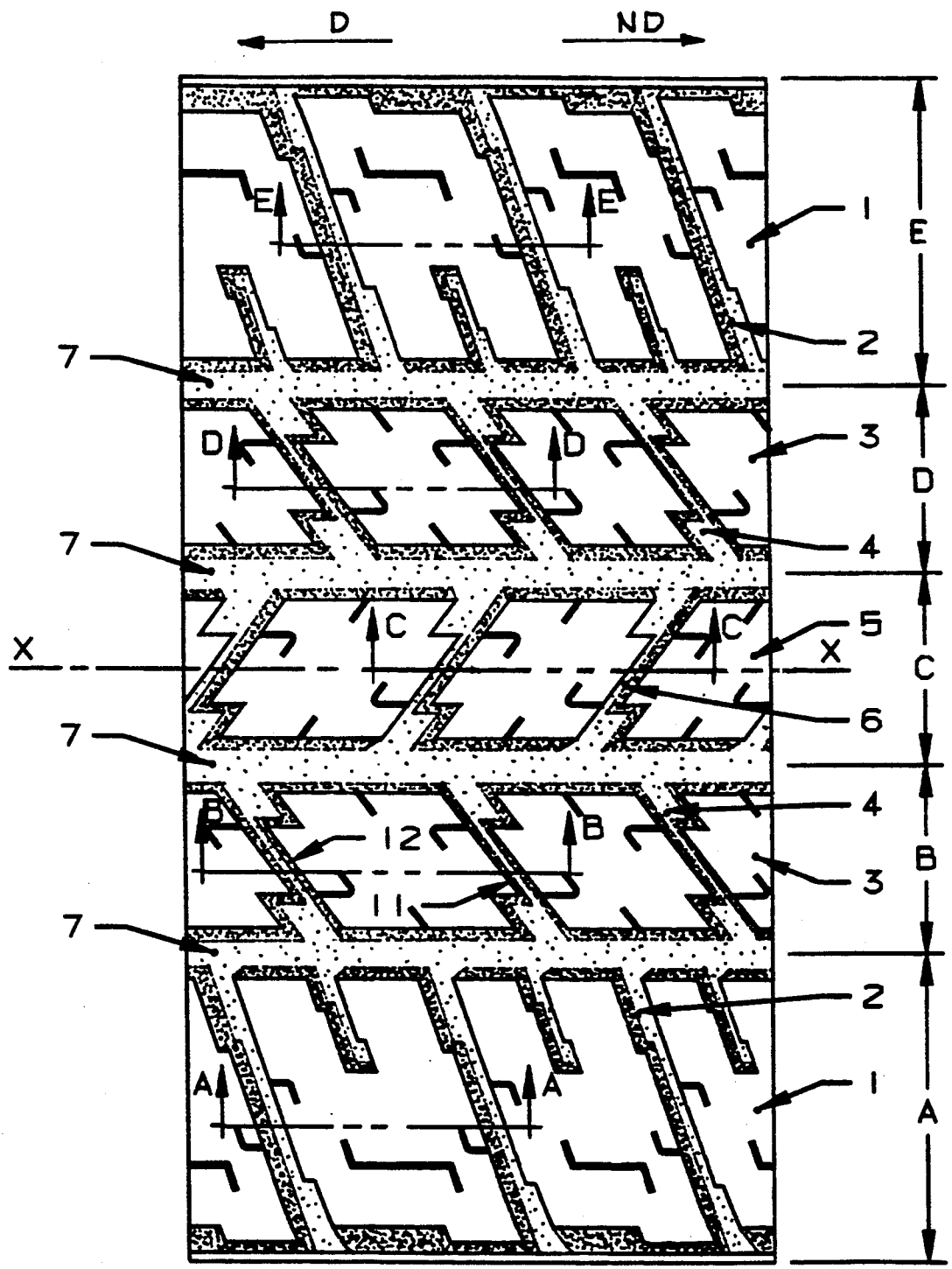
FIG. 1 is an illustration of a segment of the top view of a preferred embodiment tire showing the configuration of each groove.

The five rib tread design of FIG. 1 illustrates a typical five rib design for a passenger car tire. Circumferential grooves 7 define the five ribs. These grooves are straight in this design but can be zig zag or curvilinear and vary in width & contour within the scope of this invention. The two lateral zones A & E have lateral ribs, a center zone C has the center rib and two intermediate zones B and D have intermediate ribs. Each rib is divided laterally by lateral grooves to form tread blocks 1, 3 and 5. Lateral grooves 2, 4 and 6 are straight, having a variable width in this design, but can be zig zag or curvilinear including a constant width and variable contour within the scope of this invention. The direction of rotation of this tread design is critical for improved performance of the tire. This is a result of the lateral groove 2 of the shoulder ribs 1 having a different slope than the lateral groove 6 of the center rib 5. As viewed from the top of the tire, the vehicle direction defined by the arrow, D is appropriate for the drive axle of the vehicle. In this case, each tread block left edge 12 is leading and the right edge 11 is trailing. For the non-drive axle tire the vehicle direction defined by the arrow ND is appropriate, and each tread block left edge 12 is trailing where the right edge 11 becomes a leading edge. A simple reverse mounting of the tire on the wheel will position it for a drive axle or a non-drive axle rotation.

The cross-sections of FIG. 2 AA-EE show additional details on the lateral grooves. FIGS. 2AA and 2EE are for sections A—A and E—E respectively of FIG. 1. These lateral grooves are inclined grooves 2 within the two lateral zones A and E of the tread width. The central axis F of each lateral groove makes an incline angle $\beta_1$ with respect to an outer normal N to the tread surface 13. The series of inclined grooves 2 define inclined tread blocks 1 that comprise each lateral rib. A side surface 14 of each inclined groove 2 makes an acute angle $\theta_1$ with a contact surface 13 of the inclined tread block 1.

Figure 2E:
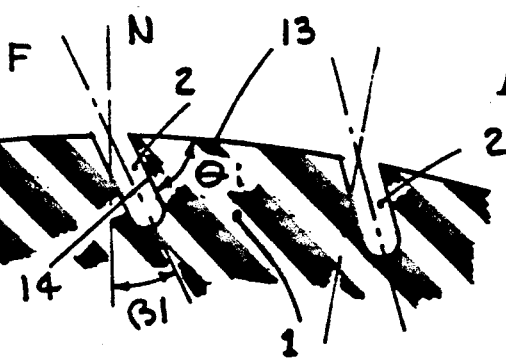
FIG. 2 has five parts AA-EE showing sectional views of the tread area parallel to the mid-circumferential plane X—X for each of the five circumferential ribs of the preferred embodiment tire of FIG. 1.
Figure 2D:
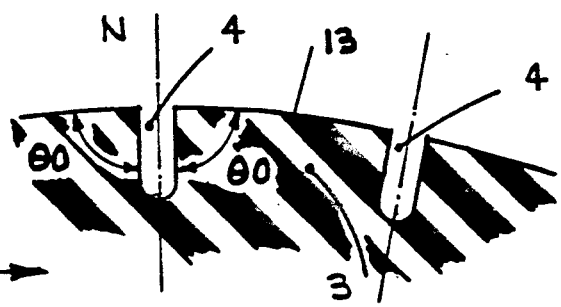
Figure 2C:
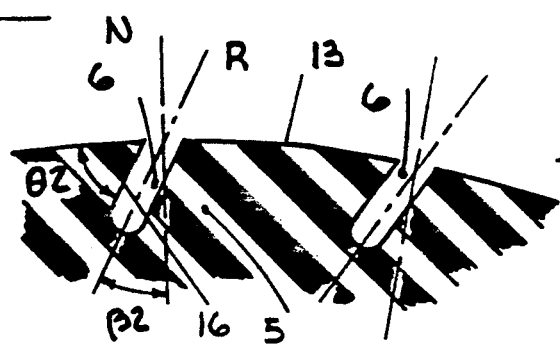

FIG. 2CC is for section C—C where the lateral grooves are reverse inclined grooves 6 within the center zone C of the tread width. The central axis R of the lateral groove makes a reverse incline angle $\beta_2$ with respect to an outer normal N to the tread surface 13. The series of reverse inclined grooves 6 define reverse inclined tread blocks 5 that comprise the center rib. A side surface 16 of each reverse inclined groove 6 makes an acute angle $\theta_2$ with the contact surface 13 of the reverse inclined tread block 5.

Figure 2B:
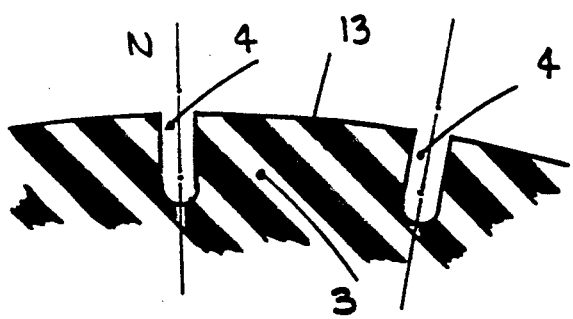
Figure 2A:
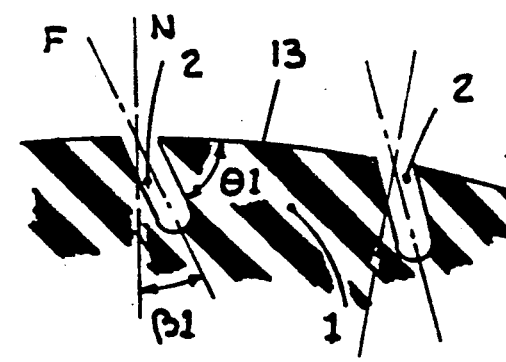

FIGS. 2BB and 2DD are for sections B—B and D—D respectively of FIG. 1. The lateral grooves are zero inclined grooves 4 within the two intermediate zones B and D of the tread width. The central axis of each lateral groove is colinear with the outer normal N to the tread surface 13. The angles $\theta_0$ between each side surface of each lateral groove and the tread contact surface 13 are right angle or obtuse angles.

The inclined lateral groove angles $\beta_1$ and the reverse inclined lateral groove angles $\beta_2$ of this five rib tire of FIGS. 1 and 2 parts AA, CC and EE have preferred angles between approximately 10 to 35 degrees. Also the relative magnitude of groove angles are selected such that the following relationship is satisfied.

$$-1.5\beta_1 < \beta_2 < -0.5\beta_1$$

A simple reverse mounting of the tire will change trailing edges of tread blocks to leading edges. The preferred embodiment for a drive axle of the vehicle is to have the acute angle $\theta_1$ of the inclined tread block 1 as a leading edge and the acute angle $\theta_2$ of the reverse inclined tread block 5 as a trailing edge. This is illustrated by vehicle direction arrow D. However, the preferred embodiment for the non-drive axle is opposite, with acute angle $\theta_1$ being on a trailing edge and acute angle $\theta_2$ being on a leading edge, as illustrated by vehicle direction arrow ND. Preferred directions with experimental evidence are discussed in more detail in the following section.

Figure 3C:
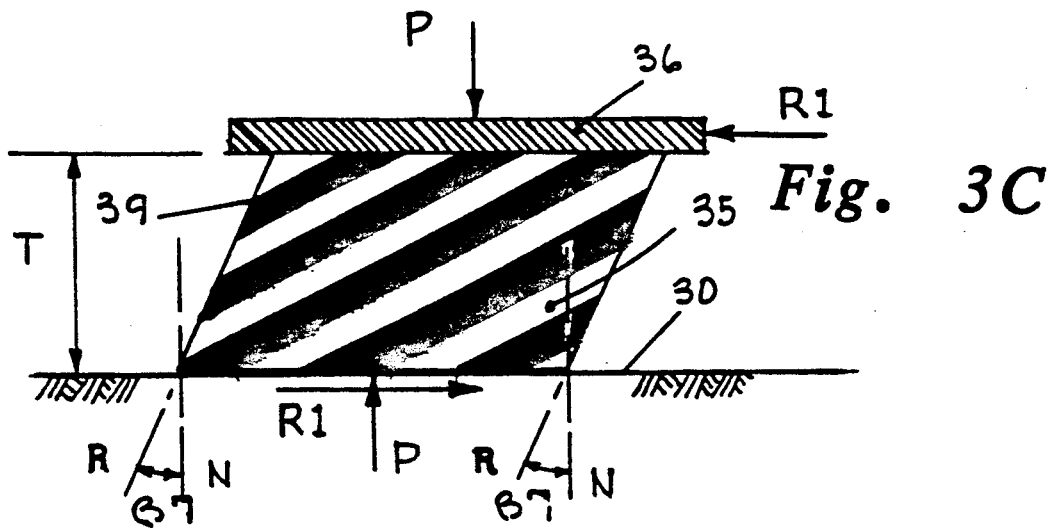
FIG. 3 has three parts A-C showing each end view of three rubber block prismatoids loaded on a flat surface to represent a physical mechanism that helps illustrate force changes obtained with the invention.
Figure 3B:
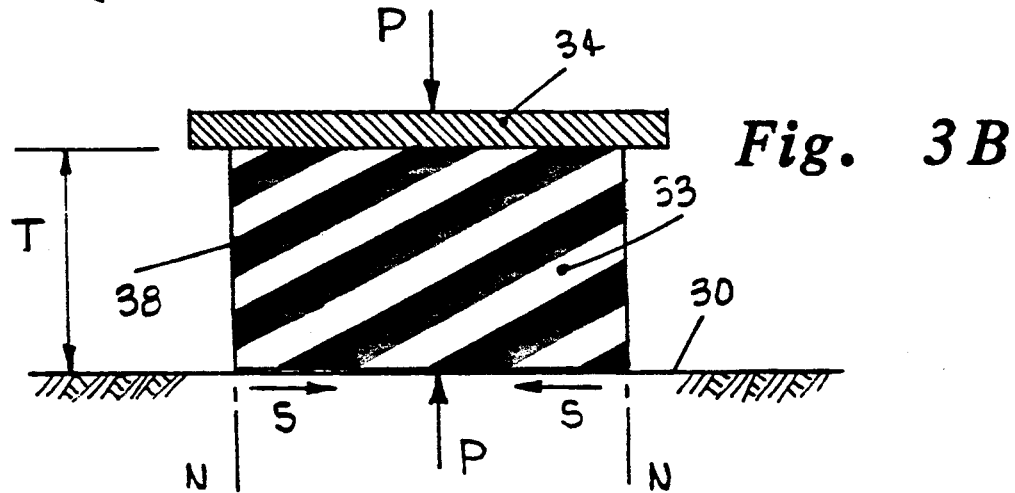
Figure 3A:
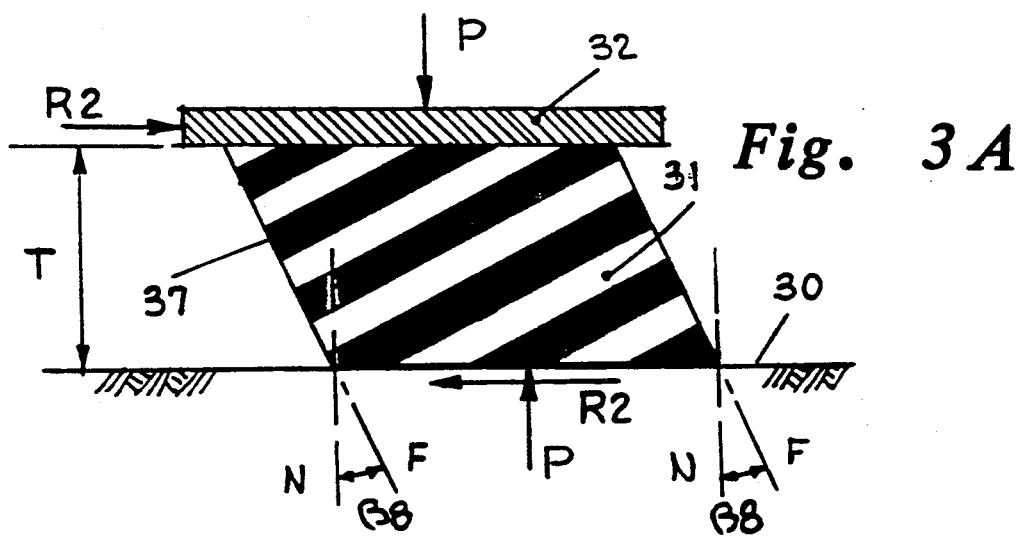
Figure 4E:
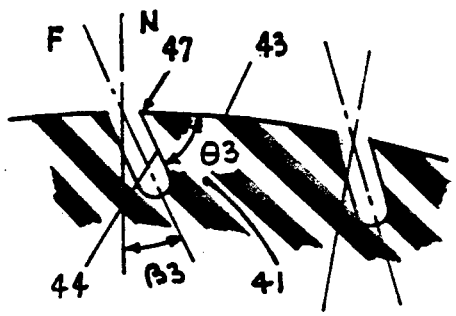
FIG. 4 has four parts A, B, D and E showing sectional views of the tread area parallel to a mid-circumferential plane, for each of the four ribs of a four rib tire similar to that illustrated in FIG. 1.

Laboratory tests with rubber block samples, that represent one physical mechanism which helps explain the invention, are illustrated in FIG. 3 parts A-C. A sectional view of each of three rubber block prismatoid samples is shown. The contact area between the supporting surface 30 and each rubber block is a rectangle. Two rubber blocks 31 and 35 have faces 37 and 39 respectively that are inclined with respect to an outer normal N to the contact area. The first rubber block 31 in FIG. 3A is made, with a thickness T and a first slope angle $\beta 8$ between an outer normal N to the contact area and a line F parallel to a first face 37, to be similar to inclined tread block 1 of FIG. 2AA or 2EE. Similarly, in FIG. 3C, the second rubber block 35 of thickness T is made similar to reverse inclined block 5 of FIG. 2CC, where a second slope angle $\beta 7$ is measured between an outer normal N and line R parallel to a second face 39. A third rubber block 33 in FIG. 3B is made as a prism to have both sides approximately normal N to supporting surface 30 with the same thickness T to be similar to tread blocks 3 of FIG. 2BB or 2DD.

When the three rubber blocks 31, 33 and 35 are loaded with load P, using relatively rigid steel plates 32, 34 and 36, different contact forces occur on each rubber block from the supporting surface 30. The average tangential forces and stresses are of interest to this invention. The steel plates model the relatively rigid belt package of the reinforced tire tread. This tread reinforcement provides a longitudinal restraint, which is modeled by limiting the movement of the steel plates to a vertical displacement. To accomplish this requires the action and reaction of force R2 on the first rubber block 31 and force R1 on the second rubber block 35. The average force R2 is opposite in direction to the average force R1. Forces S on the third rubber block 33 are from Poisson stresses, which average to zero. First and second rubber blocks 31 and 35 also have Poisson stresses, but the average forces are not zero. These differences, as a result of the incline of each rubber block, is the physical mechanism that provides the basis for this invention. This embodiment is explained in detail in the following section.

The four cross-sections of FIG. 4—A, B, D and E are typical details for a tread design having four circumferential ribs. Cross-sections are parallel to a tire mid-circumferential plane. A typical tread design may be similar to FIG. 1 without the center rib of section C and with sections B and D having reverse inclined grooves. Sections shown in FIGS. 4A and 4E are identical and illustrate inclined lateral groove angles $\beta 3$ which form inclined tread blocks 41 of the two lateral ribs. There are two center rib cross-sections, shown in identical FIGS. 4B and 4D, that have reverse inclined tread blocks 42 defined by reverse inclined groove angles $\beta 4$.

Each inclined tread block 41 has an acute angle $\theta 3$ between a side surface 44 and a contact surface 43. An edge 47 of said inclined tread block 41 having an acute angle $\theta 3$ is first to contact the supported surface (leading edge) during a rotation of the tire defined by a left vehicle direction shown by the arrow D. If the vehicle reverses direction, shown by arrow ND, this edge 47 is a trailing edge on the tread block 41, being last to contact the supporting surface. An edge 48 of said reverse inclined tread block 42, having an acute angle $\theta 4$, is last to contact the supporting surface (trailing edge) during a rotation of the tire defined by a vehicle direction shown by the direction arrow D. Reversing the vehicle direction, shown by arrow ND, the edge 48 becomes a leading edge. A simple reverse mounting of the tire will also change trailing edges to leading edges.

The inclined lateral groove angles $\beta 3$ and the reverse inclined lateral groove angles $\beta 4$ of the four rib tire tread design of FIG. 4 parts A, B, D and E have a preferred value between approximately 10 to 35 degrees. The relative magnitude of groove angles are selected such that the following relationship is satisfied.

$$-1.5\beta 3 < \beta 4 < -0.5\beta 3$$

Mounting the tire to have the acute angle $\theta 3$ of the inclined tread block 41 as a leading edge and the acute angle $\theta 4$ of the reverse inclined tread block 42 as a trailing edge is preferred for the vehicle drive axle. This corresponds to a vehicle direction defined by the arrow D. However, the preferred embodiment for the non-drive axle is opposite, with acute angle $\theta 3$ being associated with a trailing edge and acute angle $\theta 4$ being associated with a leading edge, which corresponds to a vehicle direction defined by arrow ND. Preferred directions with experimental evidence for each are discussed in more detail in the following section.

Figure 5E:
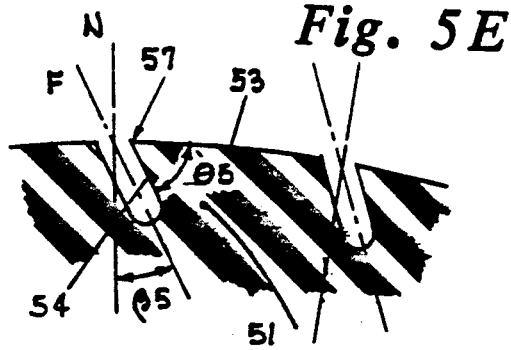
FIG. 5 has three parts A, C and E showing sectional views, parallel to a mid-circumferential plane, of the tread area of a three rib tire similar to that illustrated in FIG. 1 for each of the three tread ribs.
Figure 4D:
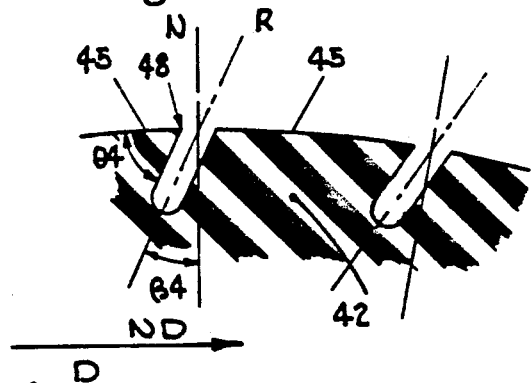
Figure 5C:
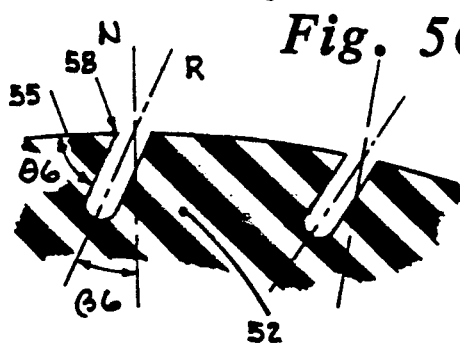
Figure 4B:
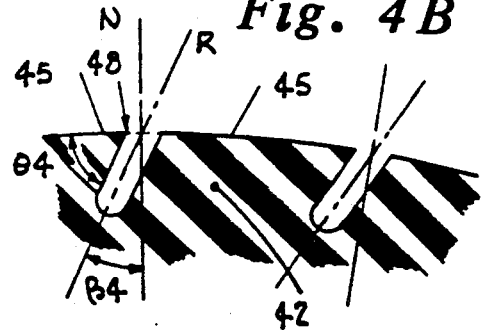
Figure 4A:
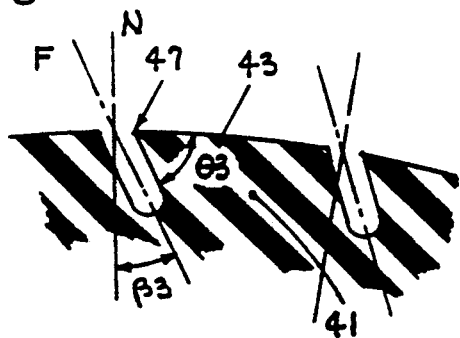
Figure 5A:
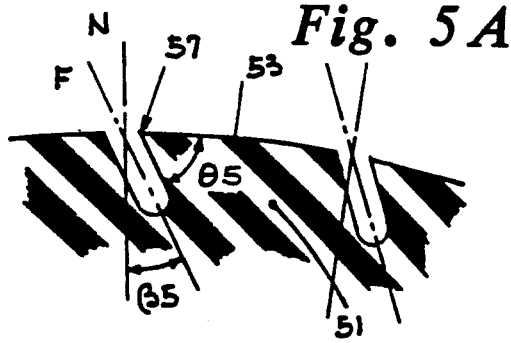

The three cross-sections of FIG. 5 parts A, C and E are typical details for a tread design having three circumferential ribs. These cross-sections are parallel to a tire mid-circumferential plane similar to those of FIG. 2 parts AA, CC and EE. A typical tread design may be similar to FIG. 1 without the intermediate ribs of sections B and D. The same discussion is appropriate as above for the remaining sections A, C and E. Sections shown in FIG. 5A and 5E are identical and illustrate inclined lateral groove angles $\beta 5$, which form inclined tread block 51 of the two lateral ribs. A center rib cross-section shown in FIG. 5C has reverse inclined tread block 52 defined by a reverse inclined groove angle $\beta 6$. Angles $\beta 5$ and $\beta 6$ are measured between an outer normal N to the tread surfaces 53 and 55 respectively and the central axis F and R respectively.

Each inclined tread block has an acute angle $\theta 5$ between a side surface 54 and a contact surface 53. An edge 57 of said inclined tread block 51, having the acute angle $\theta 5$, is a leading edge for the vehicle direction defined by the arrow D and a trailing edge for the reverse vehicle direction defined by the arrow ND. Similarly, edge 58 of said reverse inclined tread block 52, having an acute angle $\theta 6$, is a trailing edge for the vehicle direction defined by the arrow D. Furthermore, a simple reverse mounting of the tire will also change trailing edges to leading edges. Mounting the tire to have the acute angle $\theta 5$ associated with the leading edge and acute angle $\theta 6$ associated with the trailing edge is preferred for the vehicle drive axle. Mounting the tire to have the acute angle $\theta 5$ associated with the trailing edge and acute angle $\theta 6$ associated with the leading edge is the preferred embodiment for the vehicle non-drive axle. Preferred mounting to give the desired lateral groove angles are verified by experimental evidence in the following section. Inclined lateral groove angles $\beta 5$ and reverse inclined lateral groove angles $\beta 6$ of the three rib tire tread design of FIG. 5 parts A, C and E have a preferred value between approximately 10 to 35 degrees. The relative magnitude of these groove angles are selected such that the following relationship is satisfied.

$$-1.5\beta 5 < \beta 6 < -0.5\beta 5$$

The detailed description and preferred embodiments of the invention have been reduced to practice, as evidenced by the experimental results discussed below.

EXPERIMENTAL RESULTS AND BEST MODE

A number of passenger car test tires were made where the lateral grooves forming the tread blocks of lateral ribs have an incline and the lateral grooves forming the tread blocks of the center rib have a reverse incline. These tires were compared with witness tires having all radial lateral grooves, or grooves having no incline or reverse incline. Tires were tested under running conditions of load and pressure on a measuring machine which yields the resultant force per unit area on each tread block as it passes thru contact with a supporting surface. Small changes were noted for the normal force per unit area and the lateral tangential force per unit area when comparing the test tires with the witness tires. However, the longitudinal tangential force per unit area (or stress) changed dramatically and actually reversed on some of the circumferential ribs.

The scope of this invention involves the control of the relative magnitude of this longitudinal tangential stress between the various ribs of the tread. Three conditions of torque were investigated to simulate free rolling (zero torque), driving and braking. The test tires for the first set of tests were rotated such that the leading edge of the inclined tread blocks on both lateral ribs was the acute angle edge being first to contact the supporting surface. The difference between the maximum and minimum resultant longitudinal tangential stress, when comparing each of the 5 ribs, is shown below for the test tires and the witness tires. The standard deviation of the five stresses is also shown for each set of data.

| Difference in maximum and minimum longitudinal tangential stress for 5 ribs (daN/cm$^2$) | | | | |
|---|---|---|---|---|
| Torque | Witness Tire | | Test Tire | |
| Condition | max. − min. | std. dev. | max. − min. | std. dev. |
| Free Rolling | 0.29 | 0.1098 | 0.04 | 0.0147 |
| Braking | 0.31 | 0.1087 | 0.12 | 0.0413 |
| Driving | 0.49 | 0.1798 | 0.18 | 0.0646 |

These results show a much more uniform stress distribution with the test tire for this first test case.

The test tires for the second set of tests were rotated such that the leading edge of the reverse inclined tread blocks on the center rib was the acute angle being first to contact the supporting surface. This is simply a reverse rotation of the test tires when compared with the first test case. Witness tires were also run with a reverse rotation direction to be consistent. The difference between the maximum and minimum resultant longitudinal tangential stress, when comparing each of the five ribs, is again shown below for the test tires and the witness tires. Standard deviations are also shown.

| Difference in maximum and minimum longitudinal tangential stress for 5 rib (daN/cm$^2$) | | | | |
|---|---|---|---|---|
| Torque | Witness Tire | | Test Tire | |
| Condition | max. − min. | std. dev. | max. − min. | std. dev. |
| Free Rolling | 0.58 | 0.2020 | 0.98 | 0.3626 |
| Braking | 0.54 | 0.1093 | 0.85 | 0.3186 |
| Driving | 0.65 | 0.2359 | 1.04 | 0.3895 |

These results show a much more non-uniform stress distribution with the test tire for this second test case.

The results are not greatly modified for the witness tire running in the opposite direction, although there is more imbalance between maximum and minimum stresses on each rib. These differences can easily be explained by minute irregularities along the circumference of each tire in the tread pattern as well as the underlying belt package and carcass. Also, measurements of stress are obtained on only a portion of the complete circumference of the tire. The dispersion between ribs of the test tire are greatly changed for this second case, being much greater for all torque conditions.

These two measuring machine tests give consistent results when compared with rubber block laboratory tests discussed above, and illustrated in FIG. 3. Under normal running conditions the lateral ribs are bias toward braking and the center ribs are bias toward driving. The rotation of the test tires can either decrease the bias as in the first case, or increase this bias as in the second case.

Actual vehicle tests were conducted with test tires rotated in the same direction as the first test case on the machine. The test tires on the drive axles of these vehicles had even wear and lower wear rates when compared with witness tires. However, non-drive axle test tires had more uneven wear than the witness tires. Tests were then conducted with the rotation of the tires reversed on both axles to be consistent with the second set of tests on the machine. The test tire had more even wear on the non-drive axle and wear rates were approximately equal between the test tire and the witness tire. The drive axle test tire wear was worse. This surprising result was repeated on several vehicle tests. Although the actual rate of wear on the non-drive axle is frequently one-third of what it is on the drive axle for most driving conditions, uneven wear on this non-drive axle is often a cause for noise and vibration, once initiated, and is not easy to eradicate by a simple tire permutation between axles of the vehicle. This suggests another utility of this invention being a means of reducing noise and vibration.

Vehicle tests were conducted with the five rib tire, similar to that illustrated in FIG. 1, on a variety of vehicles. The optimum lateral groove inclination for these tires was approximately 25 degrees for both lateral rib tread blocks and the center rib tread blocks. The inclination of the lateral grooves may have to be modified for different tread patterns depending on various factors; such as tread contact surface transverse curvature, the number and relative width of various circumferential ribs, the tread depth, the subtread thickness, the belt package architecture, the carcass design and the various material properties. The optimum angle of inclination may also be different for tread blocks in the lateral ribs compared with tread blocks in the center ribs. A typical test result for the estimated life of tires on each axle of a luxury sedan are shown below. The front non-drive axle tires were mounted to rotate according to the second machine test case and the rear drive axle tires were mounted opposite for rotation according to the first machine test case.

| Average Estimated Life for Each Axle, Based on Most Worn Grove of Each Tire: After 15206 miles | | |
| --- | --- | --- |
| AXLE | Test Tires | Witness Tires |
| Front Axle (Non Driving) | 60,500 miles (−5.8%) | 64,250 miles |
| Rear Axle (Driving) | 36,500 miles (+15.0%) | 31,750 miles |

Visually the test tires of this test had a considerable better wear aspect than the witness tires. The heel-toe wear on the front non-drive axle and the center wear on the rear drive axle were visibly better. A lateral tread contact surface radius measurement was also made using a laser beam sensor machine. This measurement shows variations in the lateral (transverse) profile radius as wear progresses. Results for the test described above are shown below.

| Average Lateral Tread Surface Radius for each Axle (inflated tire) | | | | |
| --- | --- | --- | --- | --- |
| | Test Tires | | Witness Tires | |
| AXLE | New Tires | After 15,206 Miles | New Tires | After 15,206 Miles |
| Front Axle (Non Driving) | 540.5 mm | 540.5 mm | 546.2 mm | 447.5 mm |
| Rear Axle (Driving) | 527.0 mm | 717.3 mm | 541.0 mm | 1039.5 mm |

It is easily seen that there is less variation in the transverse tread contact surface radius for the test tires than for the witness tires. Large variations in crown profile tend to accelerate with wear once they are initiated, thus the computed estimated life comparison would be more in favor of the test tires if the test ran longer than 15,206 miles.

A comparison with the previous test was made using a front wheel drive van type vehicle with the same tire tread design used in the previous test. These results are shown in the following table.

| Average Estimated Life for Each Axle, Based on Most Worn Groove of Each Tire After 15,793 miles | | |
| --- | --- | --- |
| AXLE | Test Tires | Witness Tires |
| Front Axle (Driving) | 38,457 miles (+23.5%) | 31,131 miles |
| Rear Axle (Non-Driving) | 90,850 miles (−10.5%) | 101,527 miles |

Once again, the non-drive axle tires were mounted to rotate according to the second machine test case and the drive axle tires were mounted opposite for rotation according to the first machine test case. As before, the test tires have less center wear on the drive axle and less heel-toe wear on the non-drive axle.

The slightly higher wear or reduced life of the non-drive axle tires is not as important as the large gain in the life of tires on the drive axle. The combination of all tires results in the set of tires having an increased life with proper permutation of tires, being careful to keep the proper rotation of non-drive versus drive axle tires. Proper permutation for proper rotation results in the movement of tires from front to rear and from side to side in a "crossing pattern". In other words, the right front becomes the left rear and the left rear moves to the right front. The same exchange occurs between the left front and the right rear. It has been affirmed that the best mode use of this invention, with its inclined and reverse inclined lateral grooves and reversing the direction of rotation between the driving and nondriving axles of the vehicle, has significant utility.

Additional advantages with this invention are anticipated. The uniform longitudinal tangential stresses of the drive axle tire should help produce an even distribution of tread temperature, which is expected to give a lower rolling resistance for this tire. More even wear patterns will produce less noise and vibration. In addition, improvements in vehicle ride comfort and handling are possible as a result of uniform tangential stresses on the drive axle tire. The use of this invention on the drive axle only is also within the scope of this invention.

While the present invention has been disclosed with the preferred embodiments and best mode defined, it should be understood that there may be other embodiments which fall within the spirit and scope of the invention as defined by the following claims.

What is claimed is:

1. A pneumatic tire for a vehicle comprising a plurality of circumferential reinforcing belts, subtread rubber and tread rubber all on a radially reinforced carcass between two bead segments, with a tread design having improved contact stresses comprising a plurality of circumferential ribs bounded by circumferential grooves wherein said ribs each have a plurality of laterally extending grooves that define a plurality of tread blocks in series within each rib, characterized by the fact that:
   (a) the lateral grooves are inclined with respect to an outer normal to a tread surface in two lateral zones of a tread width defining inclined tread blocks;
   (b) the lateral grooves are reverse inclined with respect to the outer normal to said tread surface in a center zone of the tread width defining reverse inclined tread blocks;
   (c) the lateral grooves are substantially zero inclined grooves with respect to an outer normal to said tread surface in two intermediate zones of the tread width; and
   (d) when the tire is under load, said inclined tread blocks deform so as to be active in providing a change in tangential stress in a first direction and said reverse inclined tread blocks deform so as to be active in providing a change in tangential stress in a second direction opposite to said first direction.

2. The radial tire according to claim 1, wherein said inclined tread blocks each have a leading edge, making first contact with a supporting surface when said tire is rolling to move said vehicle forward, characterized by the fact that the angle between a side surface of said inclined groove and a contact surface of said inclined tread block is an acute angle, so that said inclined tread block is active in providing additional driving forces which tend to help increase the speed of said vehicle and wherein said reverse inclined tread blocks are active in providing additional braking forces to said vehicle, the combination resulting in approximately equal longitudinal average tangential unit forces on each of the circumferential ribs from said supporting surface, to be used on a drive axle of said vehicle to enhance the tread life of said tire.

3. The radial tire according to claim 1, wherein said reverse inclined tread blocks each have a leading edge making first contact with a supporting surface when said tire is rolling to move said vehicle forward, characterized by the fact that the angle between a side surface of said reverse inclined groove and an adjacent contact surface of said reverse inclined tread block is an acute angle, so that said reverse inclined tread block is active in providing additional driving forces which tend to help increase the speed of said vehicle and wherein said inclined tread blocks are active in providing additional braking forces, the combination resulting in an increase in the difference in the magnitude of the longitudinal average tangential unit forces from said supporting surface when comparing each of the circumferential ribs, to be used on a non-drive axle of said vehicle to enhance the tread life of said tire.

4. The radial tire according to claim 2, where in the circumferential ribs are further characterized by the fact that (a) there are five such circumferential ribs bounded by four circumferential grooves having either a straight, zigzag or curvilinear configuration;

(b) said tread blocks within each circumferential rib are formed by said lateral grooves having either straight, zigzag or curvilinear configuration;

(c) said inclined lateral grooves in two lateral ribs having an incline angle with respect to the outer normal to the tread surface in the range of approximately 10 to 35 degrees;

(d) said reverse inclined lateral grooves in a center rib having a reverse incline angle with respect to the outer normal to the tread surface in the range of approximately 10 to 35 degrees and having a value between approximately $-0.5$ and $-1.5$ times the incline angle of the inclined laterals grooves;

(e) said lateral grooves in two intermediate ribs having a substantially zero degree incline angle with respect to the outer normal to the tread surface; and (f) a specified first direction of rotation is marked on the tire.

5. The radial tire according to claim 3, wherein the circumferential ribs are further characterized by the fact that (a) there are five such circumferential ribs bounded by four circumferential grooves having either a straight, zigzag or curvilinear configuration;

(b) said tread blocks within each circumferential rib are formed by said lateral grooves having either a straight, zigzag or curvilinear configuration;

(c) said inclined lateral grooves in two lateral ribs having an incline angle with respect to the outer normal to the tread surface in the range of approximately 10 to 35 degrees;

(d) said reverse inclined lateral grooves in a center rib having a reverse incline angle with respect to the outer normal to the tread surface in the range or approximately 10 to 35 degrees and having a value between approximately $-0.5$ and $-1.5$ times the incline angle of the inclined grooves;

(e) said lateral grooves in two intermediate ribs having a substantially zero degree incline angle with respect to the outer normal; and (f) a specified second direction of rotation is marked on the tire.

6. A method of using a pneumatic tire having a pair of axially spaced apart beads, at least one radial carcass ply extending between and secured to said beads, a belt reinforcing package located radially outward of said carcass ply and a tread portion located radially outward of said belt reinforcing package for engagement with a ground surface, said tread portion comprising:

a tread width having a plurality of circumferential ribs separated and bounded by straight, zigzag or curvilinear circumferential grooves;

a plurality of lateral straight, zigzag or curvilinear grooves having a first incline with respect to an outer normal to a tread surface defining inclined tread blocks for the circumferential ribs within two lateral zones of said tread width; and a plurality of lateral straight, zigzag or curvilinear grooves having a second incline with respect to an outer normal to the tread surface, being opposite to said first incline, defining reverse inclined tread blocks for the circumferential ribs within a central zone of the tread width;

a plurality of lateral straight, zigzag or curvilinear grooves having substantially zero inclines with respect to an outer normal to the tread surface for the circumferential ribs within two intermediate zones of the tread width, wherein said method of using said tire comprises the steps of:

a) installing one said tire on each rim of a vehicle;

b) mounting a plurality of said rims on each drive axle of said vehicle such that said inclined tread blocks have a first inclination with respect to a forward driving motion of said vehicle; and c) mounting a plurality of said rims on each non-drive axle of said vehicle such that said inclined tread blocks have a second inclination with respect to the forward driving motion of said vehicle, said second inclination being opposite of said first inclination, resulting in improved wear rates and uniformity of the wear that increases the life of said tread portion.

7. A method of using a pneumatic tire according to claim 6, wherein the step of mounting of said tire is further characterized by the fact that:

(a) the tire is rotating on any vehicle drive axle during forward motion of said vehicle such that a first leading edge of each said inclined tread block which makes first contact with a supporting surface is an acute angle measured between a trailing face of said lateral groove and an adjacent first contact surface of said inclined tread block; and (b) the tire is rotating on any vehicle non-drive axle during forward motion of said vehicle such that a second leading edge of each said reverse inclined tread block which makes first contact with the supporting surface is an acute angle measured between a trailing face of said reverse lateral groove and an adjacent second contact surface of said reverse inclined tread block.

8. A method of using a pneumatic tire according to claim 6 wherein an additional step of rotating a plurality of said tires from the vehicle drive axle to the vehicle non-drive axle is characterized by a crossing pattern, wherein the tread life of all tires taken as a set are improved.

* * * * *